US012363812B2

(12) United States Patent
Olaleye et al.

(10) Patent No.: US 12,363,812 B2
(45) Date of Patent: Jul. 15, 2025

(54) SYSTEM AND METHODS FOR AUGMENTING VOICE COMMANDS USING CONNECTED LIGHTING SYSTEMS

(71) Applicant: SIGNIFY HOLDING B.V., Eindhoven (NL)

(72) Inventors: Olaitan Philip Olaleye, Eindhoven (NL); Dong Han, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 1010 days.

(21) Appl. No.: 17/043,479

(22) PCT Filed: Mar. 25, 2019

(86) PCT No.: PCT/EP2019/057417
§ 371 (c)(1),
(2) Date: Sep. 29, 2020

(87) PCT Pub. No.: WO2019/192869
PCT Pub. Date: Oct. 10, 2019

(65) Prior Publication Data
US 2021/0029803 A1    Jan. 28, 2021

Related U.S. Application Data

(60) Provisional application No. 62/651,288, filed on Apr. 2, 2018.

(30) Foreign Application Priority Data

Apr. 9, 2018   (EP) .................................... 18166416

(51) Int. Cl.
*G06F 17/00*     (2019.01)
*G06F 3/16*      (2006.01)
(Continued)

(52) U.S. Cl.
CPC ............. *H05B 47/12* (2020.01); *G06F 3/167* (2013.01); *G10L 15/20* (2013.01); *G10L 15/22* (2013.01);
(Continued)

(58) Field of Classification Search
CPC ...... H05B 47/12; H05B 47/13; H05B 47/125; G06F 3/167; G10L 15/20; G10L 15/22; G10L 2015/226; Y02B 20/40
(Continued)

(56) References Cited

U.S. PATENT DOCUMENTS

2011/0208524 A1* 8/2011 Haughay ................. G10L 17/08
704/E15.001
2016/0140964 A1* 5/2016 Connell, II ............. G10L 15/07
704/231
(Continued)

FOREIGN PATENT DOCUMENTS

CN    105703978 A    6/2016
CN    106415412 A    2/2017
(Continued)

*Primary Examiner* — Paul C McCord

(57) ABSTRACT

A method and system for augmenting processing of voice commands directed to speech-based computing device via a system that includes a connected lighting system and the speech-based computing device. The method includes collecting data related to a user or environmental condition in an area proximate to the speech-based computing device with the one or more sensors. One or more cues related to the user and/or local area or environment is determined from the collected data. A controller of the lighting system receives one or more parameters related to a sound input received by the speech-based computing device. The one or more parameters are updated with the user and/or environ-
(Continued)

mental cues. The sound input is analyzed with the updated parameters to interpret an intended voice command from the sound input.

11 Claims, 3 Drawing Sheets

(51) Int. Cl.
*G10L 15/20* (2006.01)
*G10L 15/22* (2006.01)
*H05B 47/12* (2020.01)
*H05B 47/125* (2020.01)
*H05B 47/13* (2020.01)

(52) U.S. Cl.
CPC ........... *H05B 47/125* (2020.01); *H05B 47/13* (2020.01); *G10L 2015/226* (2013.01)

(58) Field of Classification Search
USPC .......................................................... 700/94
See application file for complete search history.

(56) References Cited

U.S. PATENT DOCUMENTS

| | | | | |
|---|---|---|---|---|
| 2016/0378424 | A1* | 12/2016 | Kanda | G06F 3/013 |
| | | | | 700/275 |
| 2017/0188437 | A1* | 6/2017 | Banta | G10L 15/00 |

FOREIGN PATENT DOCUMENTS

| | | |
|---|---|---|
| DE | 102015205248 A1 | 9/2016 |
| KR | 20150066882 A | 6/2015 |
| WO | 2014159581 A1 | 10/2014 |

* cited by examiner

SYSTEM AND METHODS FOR AUGMENTING VOICE COMMANDS USING CONNECTED LIGHTING SYSTEMS

CROSS-REFERENCE TO PRIOR APPLICATIONS

This application is the U.S. National Phase application under 35 U.S.C. § 371 of International Application No. PCT/EP2019/057417, filed on Mar. 25, 2019, which claims the benefit of European Patent Application No. 18166416.0, filed on Apr. 9, 2018 and U.S. Patent Application No. 62/651,288, filed on Apr. 2, 2018. These applications are hereby incorporated by reference herein.

FIELD OF THE INVENTION

The present disclosure is directed generally to voice recognition systems, and more particularly to using connected lighting systems to augment voice recognition by a speech-based computing device.

BACKGROUND

Speech-based home automation devices (e.g. Amazon Echo, Google Home) suffer when the voice input is inaudible to the device. For example, a user's voice command may get lost in a highly occupied room, may get noisy due to background or ambient noise, and/or may not be received accurately by the device because of the direction, angle, posture, size and/or other feature of the speaker. As a result, deficiencies in the quality of the input voice signal can result in an input signal that cannot be accurately processed by the home automation device. Especially as such devices primarily rely on sound as the only input source.

U.S. Patent Publication No. 2017188437 describes voice-controlled light switches that act as voice-controlled endpoints where users may provide voice commands. These voice-command controlled light switches include a microphone to capture voice commands and communicate with a centrally located home automation device. However, the voice-controlled light switch approach described in the identified publication does not address the deficiencies described above.

Accordingly, there is a continued need in the art for systems and methods to improve the voice recognition performance of speech-based computing devices.

SUMMARY OF THE INVENTION

The present disclosure is directed to inventive systems and methods to improve the accuracy of voice commands in speech-based computing devices via a system that includes a communication layer between a connected lighting system and the speech-based computing device. The connected lighting system includes some integrated sensors for position, occupancy, and/or activity recognition. These can include PIR sensors, microwave sensors, thermopile sensors, temperature and other embeddable light weight sensors. The disclosed embodiments relate to augmenting input to speech-based computing devices using embedded sensors in the connected lighting system. As an example, one or more sensors, such as position, microwave, thermopile, and/or other types of sensors, may be configured to detect data related to the environment and users in the area proximate to the speech-based computing device and the lighting system. Based on the collected data, parameters related to the users and environment can be determined. For example, the users can be localized with respect to the speech-based computing device. Depending on the particular sensors utilized, additional user or environmental cues can be determined from the collected data, such as the relative height or size of the user, the bodily orientation (e.g., whether the user is standing up, sitting, laying down, etc.), the facial orientation of the user (e.g., in which direction the user is looking), the direction of movement of the user, the number of people in the room, the number of active speakers in the room, the absence of people in the room, the indoor temperature, the relative size of occupants in the room, etc. In addition, this data can be tracked over time and historical patterns in the room analyzed with the concurrently collected data. This information can be used to tune the input parameters to the voice processing algorithms used by the speech-based computing device, thereby supplementing the voice based commands to the speech-based assistant device while enhancing (or replacing) voice-based localization of the users, and other signal processing techniques such as noise cancellation or beamforming.

Generally, in one aspect, a method for processing voice commands from a user is provided. The method includes collecting, by one or more sensors in a lighting system, data related to an area proximate to a speech-based computing device; determining one or more cues from the data related to the user or environmental conditions in the area; receiving, by a controller of the lighting system, one or more parameters related to a sound input received by the speech-based computing device; updating the one or more parameters with the one or more cues; and analyzing the sound input with the updated parameters to interpret an intended voice command from the sound input.

According to one embodiment, the one or more cues includes a total number of users in the area, a direction of movement of the user, a bodily orientation of the user, a facial orientation of the user, a size or height of the user, a temperature in the area, an ambient noise level in the area, or a combination including at least one of the foregoing.

According to one embodiment, the method further includes determining a scenario in the area based on the cues. According to one embodiment, the user comprises an adult user and a child user and the method further comprises attenuating or normalizing sounds produced by the child user. According to one embodiment, the scenario includes detecting the user, or the user and one or more additional users in a zone, and the method further comprises attenuating or normalizing sound outside of the zone. According to one embodiment, the scenario includes not detecting the user and the method further comprises disregarding the sound input.

According to one embodiment, the method further includes determining an identity of the user based on stored historical information, the stored historical information including previously collected data, previously determined cues, or a combination including at least one of the foregoing.

According to one embodiment, the method further includes determining whether the user or another user in the area is a child and disabling, enabling, or modifying a subset of voice commands that the speech-based computing device will implement if the user is identified as a child.

According to one embodiment, the one or more sensors include a passive infrared sensor, a thermopile, a camera, a microwave emitter, a radiofrequency wave emitter, a temperature sensor, an ambient noise level sensor, or a combination including at least one of the foregoing.

According to one embodiment, the one or more parameters received by the controller of the lighting system include an estimated location of the user generated by the speech-based computing device using sound localization techniques.

According to one embodiment, the method further comprises retrieving prior user activity and the updating includes updating the one or more parameters with the prior user activity.

According to one embodiment, the method further includes operating the speech-based computing device in accordance with the intended voice command.

Generally in another aspect, a method for processing voice commands from a user is provided. The method includes collecting, by the one or more sensors in a lighting system, position data related to a user in an area proximate to speech-based computing device; determining a location of the user from the position data; receiving one or more parameters related to a voice input; updating the one or more parameters with the location of the user; and analyzing the voice input with the updated parameters to determine an intended voice command from the voice input.

Generally in another aspect, a lighting system for augmenting processing of voice commands from a user is provided. The lighting system includes one or more light fixtures; one or more sensors configured to collect data related to a user or environmental conditions in an area proximate to a speech-based computing device; and a controller configured to: receive the data from the one or more sensors; determine one or more cues user from the data; receive one or more parameters related to a sound input received by the speech-based computing device; update the one or more parameters with the cues; and analyze the sound input with the updated parameters to determine an intended voice command from the sound input.

According to one embodiment, the sensor includes a passive infrared sensor, a thermopile, a camera, a microwave emitter, a radiofrequency wave emitter, a temperature sensor, an ambient noise level sensor, or a combination including at least one of the foregoing.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Figure 1:
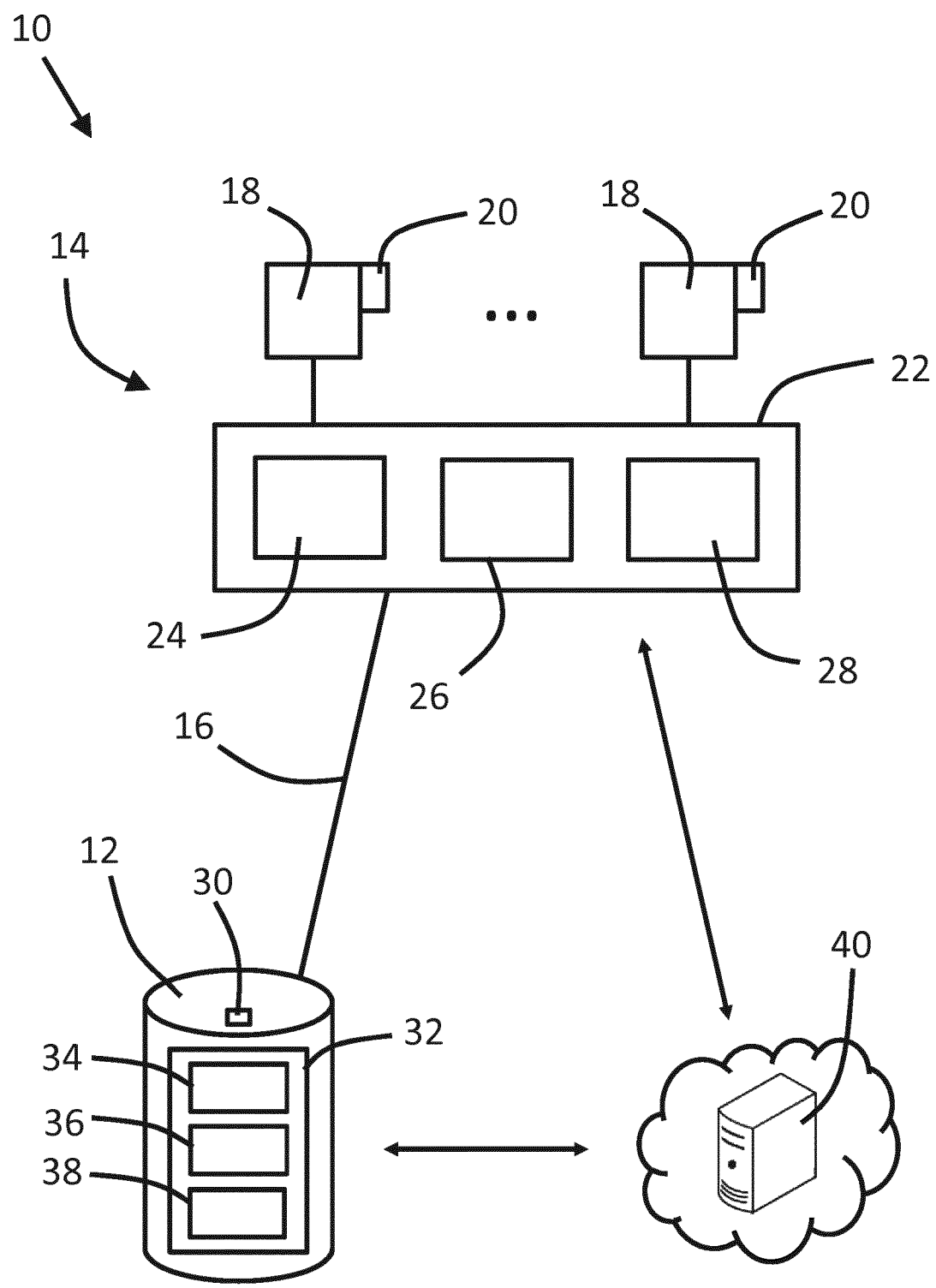
FIG. 1 is a block diagram of a system configured to augment the voice recognition capability of a speech-based computing device using a connected lighting system according to one embodiment disclosed herein.

The present disclosure describes various embodiments of speech-based computing devices and lighting systems. More generally, Applicant has recognized and appreciated that it would be beneficial to provide a system in which position, activity, occupancy, ambient data and/or other data collected by a sensor-enabled lighting system is used to augment the ability of a speech-based computing device to accurately understand or interpret a voice command from an input sound signal. A particular goal of utilization of certain embodiments of the present disclosure is to improve the ability of speech-based computing devices to correctly interpret voice commands.

In view of the foregoing, various embodiments and implementations are directed to systems and methods that include sensor-enabled lighting systems for augmenting the ability of speech-based or voice-activated computing devices to accurately interpret or understand voice commands. Factors that affect the quality of voice inputs to a speech-based device, and thus, the ability of the speech-based device to understand a voice command from the input include, among others, multiple concurrent speakers, high background noise, lack of accuracy in the triangulation of the speaker location, lack of knowledge of the position or sitting angle of the speaker, lack of information on external characteristics, e.g. room temperature or humidity, and difficulty in accurately compensating for multiple speakers in at similar angles but different ranges from the microphone array. Additionally, the quality of speech perceived by a fixed device has calibrate-able relationships with the direction of movement of the speaker, the angle and physical orientation of the person speaking, the size of the person speaking, etc.

Accordingly, the lighting system includes one or more sensors configured to detect position data related to the environment and users in the area proximate to the speech-based device and the lighting system. Based on the collected data, parameters related to the users and environment can be determined. For example, the users can be localized with respect to the speech-based device. Depending on the particular sensors utilized, additional user or environmental cues can be determined from the collected data, such as the relative height or size of the user, the bodily orientation (e.g., whether the user is standing up, sitting, laying down, etc.), the facial orientation of the user (e.g., in which direction the user is looking), the direction of movement of the user, the number of people in the room, the number of active speakers in the room, the absence of people in the room, the indoor temperature, the relative size of occupants in the room, etc. In addition, this data can be tracked over time and historical patterns in the room analyzed with the concurrently collected data. This information can be used to tune the input parameters to the voice processing algorithms used by the speech-based device, thereby supplementing the voice-based commands to the speech-based assistant device while enhancing (or replacing) the estimated location of the users determined by the speech-based device using sound localization, and other signal processing techniques such as noise cancellation or beamforming.

Referring to FIG. 1, in one embodiment, a system 10 is provided including a speech-based or voice-activated computing device 12, a lighting system 14, and a communication layer such as a data-link 16 connecting the computing device 12 and the lighting system 14 in data communication. The computing device 12 may be referred to herein as the "smart device 12", and can include any known or developed speech-based or voice-activated computing device. Examples include the device marketed by Amazon under the name Echo, the device marketed by Google under the name Google Home, and the device marketed by Apple under the name HomePod.

The lighting system 14 includes one or more light fixtures 18, at least one of which is equipped with a sensor 20 configured collect data related to the location, position, or orientation of one or more nearby users (people, individuals, etc.) and/or data related to one or more ambient or environmental conditions in the proximate area, such as temperature, noise level, etc. In one embodiment, the sensors 20 each comprise a passive infrared (PIR) motion detecting sensor, while in other embodiments, the sensors 20 may include thermopiles, microwave emitters, radiofrequency wave emitters, cameras, temperature sensors, noise level sensors, or any other sensor that can detect an ambient or environmental condition, the position of nearby individuals, or can be used to determine the position of nearby individuals (e.g., a motion detector can be used to determine the location of a user based on the detected movement). Many position sensors are additionally capable of determining the relative size and/or shape of detected objects. For example, an approximate height or bodily orientation of a user can be determined by a PIR sensor or an array of PIR sensors by mapping the particular shape and size of the detected infrared emission, while movement can be determined by tracking a change in location of the infrared emission. Other position sensors can similarly at least roughly determine the shape, size, and/or movement of objects such as people.

Connected lighting systems currently exist that have light fixtures configured to turn on in response to detected movement (and/or turn off automatically if user movement is not detected for some predetermined period of time). Advantageously, this type of existing lighting system installation can be leveraged to assist in formation of the systems and methods disclosed herein. Commercially available examples of such a system for use in forming the lighting system 14 includes the lighting system marketed under the name Hue by Philips Lighting and the building control system marketed under the name CogniPoint by PointGrab, Inc. It is thus to be appreciated that building control systems and other sensor-enabled systems may be utilized in addition to and/or in lieu of the lighting system 14.

The lighting system 14 may include a controller 22 arranged with a processor 24, a memory 26, and a communication module 28. The controller 22 may act as a central unit or bridge in communication with the light fixtures 18 to facilitate controlled operation of all or a subset of the light fixtures 18 (e.g., to change the color of the light emitted by the light fixtures, set auto-dimming features, etc.). The light fixtures 18 may be in direct communication with each other (e.g., part of a mesh network), or only in communication via the controller 22. It is to be appreciated that in lieu of, or in addition to, the controller 22 being arranged as a central unit, one or more of the light fixtures 18 may be arranged with a separate controller (which may be generally arranged as discussed with respect to the controller 22).

The processor 24 may take any suitable form, such as a microcontroller, plural microcontrollers, circuitry, a single processor, or plural processors configured to execute software instructions. The memory 26 may take any suitable form or forms, including a volatile memory, such as random access memory (RAM), or non-volatile memory such as read only memory (ROM), flash memory, a hard disk drive (HDD), a solid state drive (SSD), or other data storage media. The memory 26 may be used by the processor 24 for the temporary storage of data during its operation. Data and software, such as the algorithms or software necessary to analyze the data collected by the sensors 20, an operating system, firmware, or other application, may be installed in the memory 24. The communication module 28 is arranged to enable wired or wireless signal communication between the components of the lighting system 14. The communication module 28 may be any module, device, or means capable of enabling the transmission and/or reception of a wired or wireless communication signal, utilizing technologies that include, but are not limited to Wi-Fi (e.g., IEEE 802.11), Bluetooth, cellular, Ethernet, Zigbee, etc.

The smart device 12 may also include a microphone 30 that is configured to receive sound inputs that are processed, e.g., by a controller 32, via any desired voice recognition technique to cause operation of one or more functions of the smart device 12 in response to commands issued via voice input. The microphone 30 may comprise an array of microphones, e.g., to enable sound localization, beamforming, or other signal processing techniques. The controller 32, similar to the controller 22, may include a processor 34, a memory 36, and a communication module 38, generally arranged as described above. The smart device 12 may include a specific trigger phrase or code word ("trigger") that is used to transition the smart device 12 from a passive listening mode (e.g., in which the smart device 12 is processing sound inputs in a limited capacity, e.g., only to the extent necessary to identify whether a nearby user has spoken the trigger) to an active listening mode in which the smart device 12 processes the voice input for one or more commands following identification of the trigger. Sound signals representing the captured voice inputs may be stored temporarily in the memory 36 and analyzed via the processor 34 according to any voice recognition technique or methodology.

The data-link 16 may be any suitable means for transferring data between the device 12 and the system 14 (e.g., via the communication modules 28 and 38 of the controllers 22 and 32, respectively). The data-link 16 may include any wired or wireless communication protocol or technology, or combinations thereof. In one embodiment, the data-link 16 includes an Ethernet compatible cable connecting the smart device 12 and the controller 22 of the lighting system 14 together. In other embodiments, the data-link 16 may be formed wirelessly via Bluetooth, Wi-Fi, Zigbee, or other protocol. It is to be appreciated that any number of intermediary network devices may be connected to establish the data-link 16, such as a router, bridge, modem, etc.

Additionally, the smart device 12 and/or the lighting system 14 may be in communication with a cloud-implemented server 40 (e.g., via the communication modules 28 and/or 38), which may additionally or alternatively comprise a controller for assisting the smart device 12 and/or the lighting system 14 with additional computing resources. As such, it is to be understood that reference to the controllers 22 and/or 32 herein shall include embodiments in which at least some of the computing resources or processes discussed with respect to the controller 22 and/or 32 are provided by the server 40. In other words, the controllers 22 and 32 may in some embodiments be at least partially formed by the server 40. Further, it is noted that the smart device 12 and the lighting system 14 may be combined or integrated, e.g., into a single device, or such that the controllers 22 and 32 are combined or integrated together. It is also to be appreciated that the data-link 16 could be established indirectly between the smart device 12 and the lighting system 14 over cloud-implemented infrastructure, such as the server 40, by both of the smart device 12 and the lighting system 14 being in communication with the internet.

Figure 2:
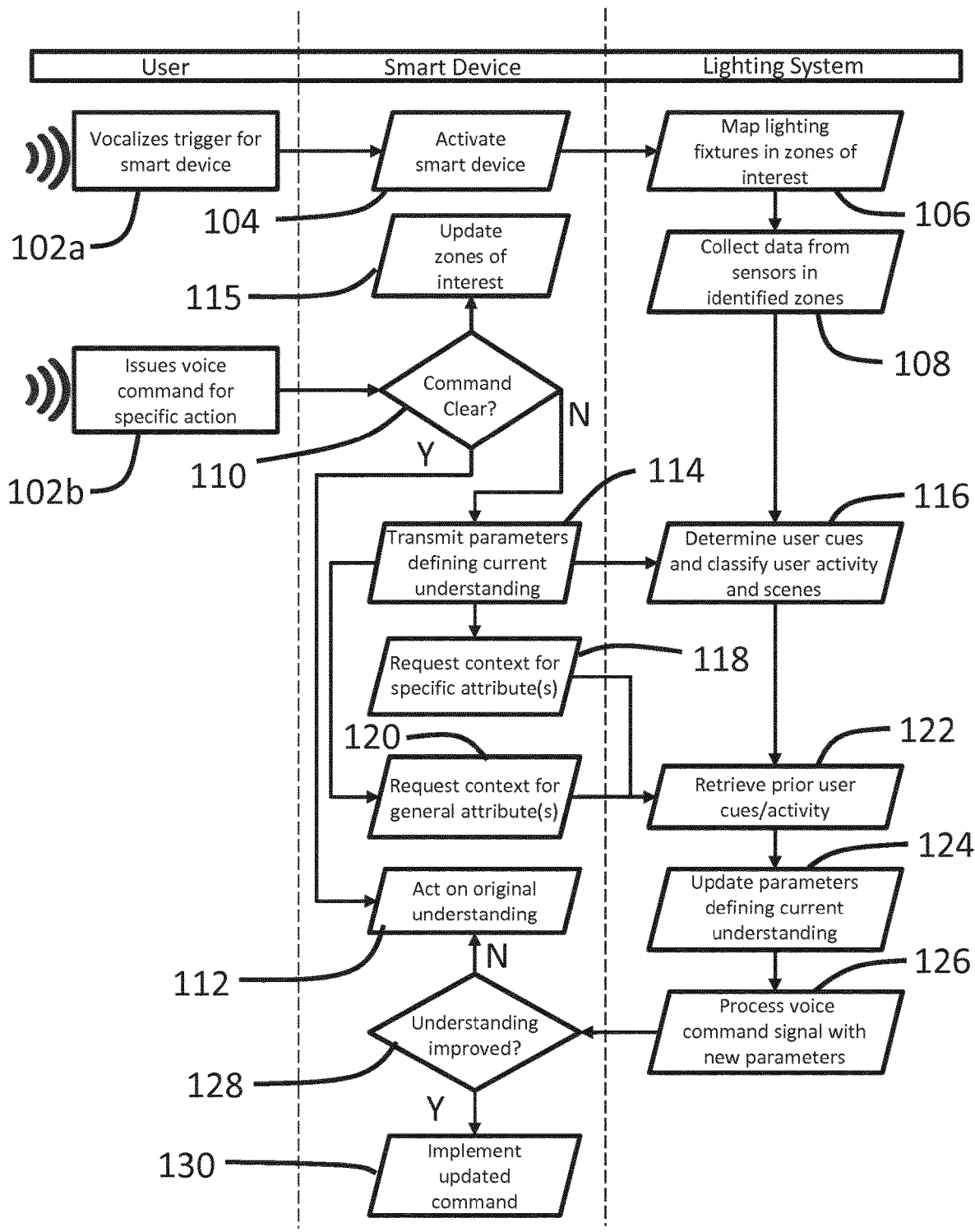
FIG. 2 is a flowchart illustrating a method for using a system, such as the system of FIG. 1, to augment the voice recognition capability of a speech-based computing device using a connected lighting system according to one embodiment disclosed herein.

A method 100 is illustrated in FIG. 2 for operating a voice command interpretation system (e.g., the system 10) to augment performance of a speech-based or voice-activated computing device (e.g., the smart device 12) with a sensor-enabled lighting system (e.g., the lighting system 14 having the sensors 20). As discussed in more detail below, the method 100 can be used to augment performance such as by correcting for inaccurate or undecipherable voice commands to the speech-based or voice-activated computing device, improving accuracy in interpreting commands in crowded rooms, identifying minors or children, accounting for orientation and/or direction of movement of users more accurately, attenuating or normalizing sounds originating from non-users (e.g., media devices), etc.

The method 100 starts at step 102*a* in which a user speaks to the smart device. At step 104, the vocalization of the user is received (e.g., via the microphone 30) and analyzed by the smart device (e.g., converted into a digital signal by the controller 32). In response to detection of the vocalization, the smart device is activated and/or enters an active mode. For example, in the activate mode the smart device may be configured to actively receive and respond to a voice command issued by the user. The vocalization may be determined by the controller 32 analyzing a voice input received the microphone 30 of the smart device 12.

Upon activation of the smart device, an initiation signal can be sent to, or intercepted by, the lighting system (e.g., over the data-link 16) to initiate step 106. At step 106, the lighting system maps the relevant area, zones in the relevant area, and/or identifies which light fixtures in the lighting system correspond to the relevant area or zones. For example, the initiation signal sent by the smart device may comprise an approximate zone, area, or direction that the smart device determined the voice trigger to have originated from, e.g., by utilizing a multi-microphone array and sound localization techniques.

Step 106 proceeds to step 108 in which the lighting system begins collecting, acquiring, and/or analyzing collected data from its integrated sensors (e.g., the sensors 20). In order to limit required computing resources, a sensor-enabled lighting system may under normal circumstances routinely discard, delete, or highly compress collected data collected by its sensors. Accordingly, step 108 may include storing a relatively increased amount of raw or uncompressed data, rather than discarding or over compressing this data. Step 108 may result in the collection of data for a preset amount of time, e.g., a few seconds, immediately following the initiation signal being sent from the smart device at the end of step 104 (and/or immediately preceding, if the already-compressed data is used, or the data is stored for some period of time before compression or deletion).

At step 102*b*, the user continues speaking in order to issue one or more voice commands instructing the smart device to take some specific action. At step 110, the voice command is received and analyzed according to any desired voice recognition or signal processing algorithms to determine whether the command is clearly understood. If the command is decipherable, the method 100 may end at step 112 in which the smart device operates in accordance with the original understanding of the voice command. If the command is not decipherable, step 110 continues to step 114 in which some or all of the parameters defining the current understanding or interpretation of the command (e.g., the original sound signal, the sound signal processed by beamforming or other technique, the position of the user estimated by sound localization, etc.) are provided to the lighting system. Step 110 may also independently proceed to step 115 at which the relevant zones of interest are redefined, selected, or updated, e.g., for future cycles of the method 100.

At step 116, the lighting system uses the transmitted parameters from step 114 and the collected data from step 108 to classify the user activity and environmental features. More particularly, this involves determining one or more "cues" related to the users or environmental conditions, as well as one or more "scenarios" describing the current user activity and environmental scene or features. For example, the "cues" may comprise quantifiable information calculated or determined from the data regarding the users in the monitored area, such as the total number of users in the area or zone, the particular location of each user in the designated area or zone, the direction of movement (or lack of movement), bodily orientation (e.g., whether the user is sitting, standing, laying down, etc.), facial orientation (e.g., the direction that user is looking), the relative size (e.g., height) of the users. The cues may also include environmental cues such as the temperature, ambient noise level, etc. It is to be appreciated that the cues may include any combination of these or other features that can be quantifiably ascertained from the data collected by the sensors. With respect to the system 10, the collected data may be stored in the memory 26 of the controller 22 along with an algorithm (e.g., a cue retrieval algorithm) configured to enable the processor 24 to analyze the data to identify, calculate, or otherwise determine one or more of the determined cues.

In contrast, the "scenarios" refer to probabilistic guesses or higher level determinations made based on the cues, which more generally describe or label the current scenario in the monitored area. For example, the system may have different combinations of cues that indicate different scenarios, such as when an adult and child are present, when a group or gathering of users are present, when only a single user is present, or when no users are present. More specifically examples are discussed below with respect to FIG. 3. With respect the system 10, the cues can be stored in the memory 26, and which can be used as inputs to another algorithm (e.g., a scenario retrieval algorithm) stored in the memory 26 that is configured to determine whether any of the scenarios are applicable based on the cues.

Step 114 may also proceed to step 118 and/or 120 at which the smart device requests additional context for a specific attributes or general attributes, respectively. For example, the specific attributes could be related to specific cues (e.g., the location of one or more users, the total number of users, etc.), while the general attributes could include any of the above-discussed scenarios, a total number of a particular type of user (e.g., a number of users determined to be children based on their measured height), etc.

At step 122, the lighting system retrieves stored information related to prior cues and activity. For example, the collected data and cues can be analyzed for patterns or trends and the data associated with each pattern or trend correlated together. In one embodiment, the system is configured to create one or more profiles that correlate related data and cues. Information describing the user's habits, such as the common locations, bodily and/or facial orientations, times of day, days of the week, etc., at which each user frequently issues voice commands can be tracked. In other words, the system can track data representative of where, when, and what a user is doing each time the user issues a voice command in order to spot any patterns in behavior. For example, if a certain user commonly issues voice commands each night while sitting on their couch, or while cooking at the stove, or during weekdays in the early evening as soon as they arrive home at their front door, this information can be tracked and stored.

It is to be appreciated that the information transmitted from the smart device in step 114 (e.g., the sound signal representing the voice command) may also be stored in this type of prior user activity profile. In one embodiment, "voiceprints" may be generated for each voice command as a combination of different acoustic characteristics that quantify each user's voice. For example, a voiceprint may include a spectrographic analysis of a user's speech to identify characteristics such as combinations of sound wave frequency and amplitude of the sound signal produced by the user's unique physiology as that user pronounces different words.

In this way, as a user interacts with the system 10, information such as the location of the user while issuing the command, the bodily and/or facial orientation of the user while issuing the command, the command issued by the user, the time of day and/or day of the week at which the user issued the command, quantifiable vocal characteristics (e.g., voiceprint) of the voice command, etc., can be tracked, compiled, and stored, e.g., in respective profiles. The profiles may be stored (e.g., in the memory 26) as an array, matrix, table, etc. For example, a different profile may be generated for each different user that the system detects (e.g., by analyzing information such as the measured size/height of the user, the voiceprint of the user, etc.). As another example, profiles may be generated corresponding to times of day at which events frequently occur.

In one embodiment, the user profiles are utilized to detect which user is issuing the voice command, and the system reacts differently depending on which user is identified. For example, the system 10 may be configured to identify the users using stored profile information as discussed above, such that certain "personal" commands or commands associated with a high security level are implemented only if the proper user is identified. For example, a voice command to check a user's bank account balance may only be implemented by the system 10 if the user owning that bank account is identified as the person issuing the voice command.

As noted above, the voice commands issued at each of these events can be tracked and correlated with the time and collected data. For example, if a user consistently requests their smart device to turn off the lights every day at around 10:00 PM, then the voice command of "turn off the lights" can be stored, along with the usual time range at which the voice command is issued, where the user most commonly is when issuing the command, etc. As another example, if the sensors include temperature sensors and the measured temperature is abnormally hot or cold (e.g., above or below some threshold, which threshold may be preprogrammed or determined based on historical trends), then the system may assign a greater likelihood to interpretations of input voice commands that request the smart device to control operation of a thermostat in accordance with the measured temperature (e.g., increase the temperature if it is cold, or decrease the temperature if it is hot).

In this way, if the smart device determines that multiple different interpretations of the voice command are possible, the prior user data can be useful as a tie-breaker to assign a higher likelihood to the interpretation that most closely matches the historical trends. As another example, since the location, movement, bodily orientation, facial orientation, etc. of the user with respect to the smart device will affect which algorithms and/or input parameters to the algorithms should be used to yield the best results, the historical user activity data may also be useful in identifying a selection of different algorithms or input parameters to the algorithms that can be tested by the system, e.g., in an attempt to see if any of these tested combinations yield a more intelligible voice command from the input sound signal.

At step 124, the parameters defining the current understanding or interpretation of the voice command (from step 114) are updated, i.e., with one or more of the newly determined cues and scenarios (from step 116), and prior user activity (from step 122). For example, if the smart device is utilizing a sound localization algorithm (e.g., to facilitate beamforming or noise cancellation), the smart device estimates the relative position and/or angle of the speaker with respect to the smart device based on the differences between the received voice input at each microphone of a microphone array. In this example, at step 124, the user position/angle estimated by the smart device may be compared to, averaged with, and/or replaced by the position/angle determined from the position data, cues, and/or prior use activity as described with respect to steps 108, 116, and 122. Additionally, the parameters defining the current understanding of the voice command may be supplemented by information that is not ascertainable from the smart device, such as the angle at which the user is directing their vocalization (i.e., facial orientation), whether the user is moving and in what direction, or whether the user is standing, sitting, or laying down (i.e., bodily orientation).

At step 126, the updated parameters are used as inputs into one or more voice recognition algorithms to process the voice command signal. The voice recognition algorithms may be the same as those originally used by the smart device as discussed with respect to step 110. At step 128, the reprocessed voice command signal from the step 126 is re-analyzed to determine whether the understanding or interpretation of the voice command has been improved. If not, the method ends at step 112 in which smart device acts on the original understanding. If no possible understanding can be determined, step 112 may result in the smart device failing to take action or requesting the user to repeat the command. If the understanding has been improved (e.g., the smart device successfully interprets a voice command from the processed sound signal), then the method 100 ends at step 130 in which the newly interpreted command is implemented. It is to be appreciated that the steps 116, 122, 124, and/or 126 may be carried out by a lighting system (e.g., the lighting system 14) as discussed, and/or by the smart device (e.g., the smart device 12), cloud-based infrastructure (e.g., the server 40), or combinations thereof.

Figure 3:
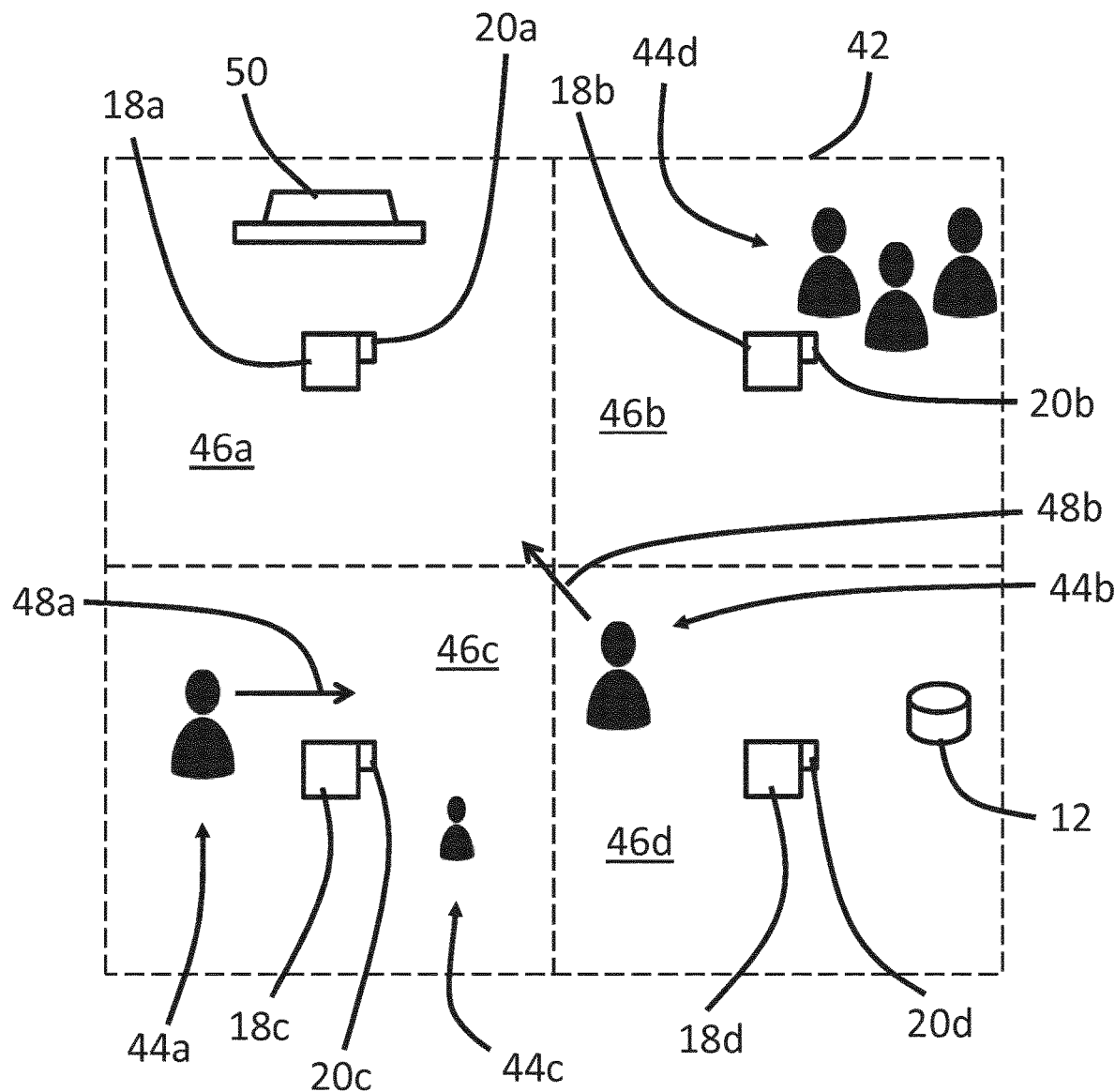
FIG. 3 is a schematic plan view of representative area having a connected lighting system configured to augment the voice recognition capability of a speech-based computing device according to one example described herein.

To better appreciate various embodiments and implementation of the systems and methods disclosed herein, such as the system 10 and the method 100, FIG. 3 illustrates an example in which a plurality of the light fixtures 18, specifically light fixtures 18a, 18b, 18c, and 18d, are installed in a representative environment or area 42. Each of the light fixtures 18a-18d includes one or more of the sensors 20, namely sensor 20a, 20b, 20c, and 20d. Additionally, a plurality of representative users 44 is illustrated in FIG. 3, namely, users 44a, 44b, and 44c, and a group of users 44d.

The data collected by the sensors 20 may be used to build or determine a map of the area 42 and/or to localize the users 44 within the area 42. For example, in FIG. 3, each of the sensors 20a-20d corresponds to one or more zones of interest (or simply "zones") 46, designated more particularly as zones 46a, 46b, 46c, and 46d. For example, the zones 46 may be the areas in which each of the sensors 20 is arranged to collect data (e.g., if the sensor 20d senses the user 44b, then it is known that the user 44b is in the zone 46d corresponding to that sensor). It is to be appreciated that in addition to or alternatively to the zones 46, the area 42 may be further divided into a different number of zones, subdivided into a number of subzones in each zone, and/or a coordinate system may be used that designates reference coordinates (e.g., x and y coordinates) for localizing the users detected by the sensors 20. Furthermore, the zones 46 are shown as rectangular in shape, but the zones 46 may be formed in any other geometric or irregular shape. If the sensors 20 rely on a line-of-sight to the users, the zones 46 may be at least partially defined by walls and other obstructions. For example, each room in a house may be a different zone.

In one embodiment, the orientation and/or direction of movement of the user(s) are determined, e.g., as cues in accordance with step 116 of the method 100. As one example, the orientation and/or direction of movement of the user can be used to assist in determining which of the users is issuing the voice command received by the smart device 12, e.g., by assigning a higher likelihood to users that are facing toward the smart device 12 than users that are facing away from the smart device. In one embodiment, the sensors 20 include at least one camera arranged to capture images (including video). In a further embodiment, the controller 22 (e.g., stored in the memory 26 or in memory of the server 40) a deep learning mechanism, such as an artificial neural network that has been trained to identify objects or features in images, such as person and/or facial recognition. In one embodiment, it can be detected whether the users are moving, e.g., by tracking the users within a zone or across zones corresponding to the sensors 20.

For example, with respect to FIG. 3, since both the users 44a and 44b are at approximately the same angle with respect to the smart device 12, the smart device 12 may have difficulty distinguishing between sound signals produced by the both the users 44a and 44b. Using the data collected by the sensors 20 and the cues determined from the collected data, the system 10 may assign a greater likelihood to the user 44a since an orientation represented by an arrow 48a indicates that the user 44a is facing generally toward the device 12, while an orientation 48b indicates that the user 44b is facing generally away from the device 12. The more exact location of the user 44a can be provided, e.g., at step 124, to update the input parameters to the voice recognition algorithm. In one embodiment, the exact locations of both of the users 44a and 44b are provided, e.g., at step 124, and the results compared, e.g., at step 128, to see if a better understanding is achieved for either the exact locations of either of the users.

Based on the direction of movement toward a particular area, the system 10 may assign greater likelihoods to interpretations of the voice command that pertain to the area into which the user is moving. For example, as another example, the arrow 48b may indicate a direction of movement for the user 44b (i.e., the user 44b is detected as walking in the direction indicated by the arrow 48b). In this example, the direction 48b generally indicates that the user 44b is walking toward a television 50, so interpretations of the voice commands related to the television 50 may be associated with a higher confidence by the system 10. That is, the system 10 may determine that the voice command possibly includes the voice instruction "turn on the TV" and therefore assigns a higher confidence to this interpretation since the user 44b is walking toward the television 50. As another example, a user may be detected as moving toward a particular room or area of their house, e.g., toward the kitchen, and interpretations of voice commands related to the user's kitchen may be assigned a higher confidence.

If deep learning mechanism trained with facial recognition capabilities is included by the system 10, then the orientation of the users may be determined at least partially based on detecting in which direction the users' faces are aimed. In addition to the use in determining which of multiple possible users issued the voice command, the direction of movement and/or orientation can be useful in processing the sound signal resulting from the received voice input. For example, the same sentence spoken by a user facing toward (e.g., the user 44a) and away (e.g., the user 44b) from the device 12, or while moving away from or toward, may result in a quantifiably distinguishable sound signal, e.g., due to the Doppler effect, reflection, reverberation, or other acoustic characteristics of the room or environment in which the user is located. In this way, different sound signal filtering techniques may be employed based on the orientation and/or direction of movement of the user issuing the voice commands.

As noted above, the system may be configured to operate in accordance with an adult-child scenario, in which a first user that is relatively tall (e.g., above a preset height or size threshold) and/or has a voiceprint that is indicative of an adult (e.g., lower frequency ranges in speech), and a second user that is relatively small (e.g., below a preset height or size threshold) and/or has a voiceprint that is indicative of a child (e.g., higher frequency ranges in speech) are both detected. Based on this scenario, the system may more readily attenuate or normalize, e.g., using noise cancellation or beamforming, voice inputs that are determined as originating from the child, and favor those determined as originating from the adult. For example, in FIG. 3 the user 44a is illustrated as being taller/larger than the user 44c. In this way, the system 10 may more readily include cues related to the user 44a when analyzing the input sound signal and/or normalize voice inputs from the direction of the user 44c. As another example, certain commands can be disabled or modified in the presence of a child, e.g., to implement parental controls. For example, a request to play a media file (e.g., song, movie, etc.) that is tagged as for mature audiences (e.g., due to the file name, metadata, etc.) may not be implemented if a child, e.g., the user 44c, is detected as being present. As another example, only a subset of commands identified by the system as "child-friendly" may be implemented if the voice command is determined as originating from a child, e.g., the user 44c.

As another example, the system may be configured to detect whether there is a plurality of different users in close proximity to each other, such as the group of users 44d shown in FIG. 3, and from this determine the scenario as including a group, gathering, or party. In this way, the smart device can compensate for noise coming from other areas of the room. Similarly, the system may be configured to detect the presence of only one person in the area, but multiple sound sources. In this single-user scenario, the sound inputs from any other sources other than the particular direction of the identified user can be attenuated or normalized. As another example of a no-user scenario, the system can determine that there are no users in the area, and accordingly normalize for commands coming from media devices when there is no person present in the room. For example, if none of the users 44 were present in the example of FIG. 3, then this information could be used to cause the smart device 12 to disregard noise produced by the television 50 or other media device that might otherwise inadvertently trigger activation of the smart device 12 when no one is around.

Those of ordinary skill in the art will appreciate that FIG. 3 is illustrative of a non-limiting subset of particular embodiments and that data from a sensor-enabled lighting system may be used to augment performance of a speech-based or voice-activated computing device in a variety of other ways.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A method for augmenting voice commands from a user comprising:

collecting, by one or more sensors in a lighting system configured to collect data related to a location of the user, the data related to an area proximate to a speech-based computing device;

determining one or more cues from the data related to the user, the one or more cues including a location of the user with respect to the speech-based computing device;

determining a scenario in the area based on the one or more cues, the scenario including detecting a presence of an additional user;

disregarding the sound input based on the presence of the additional user;

receiving, by a controller of the lighting system, one or more parameters related to a sound input received by the speech-based computing device, the one or more parameters including an estimated location of the user generated by the speech-based computing device using sound localization techniques;

updating the one or more parameters with the one or more cues;

analyzing the sound input with the updated parameters to interpret an intended voice command from the sound input; and determining an identity of the user based on stored historical information, the stored historical information including previously determined cues.

2. The method of claim 1, wherein the one or more cues includes a total number of users in the area, a direction of movement of the user, a bodily orientation of the user, a facial orientation of the user, a size or height of the user, a temperature in the area, an ambient noise level in the area, or a combination including at least one of the foregoing.

3. The method of claim 1, wherein the user comprises one of an adult user and a child user and the method further comprises attenuating or normalizing sounds produced by the child user.

4. The method of claim 1, wherein the scenario includes detecting at least one of the user and one or more additional users in a zone, and the method further comprises attenuating or normalizing sound outside of the zone.

5. The method of claim 1, wherein the stored historical information further includes previously collected data.

6. The method of claim 1, further comprising determining whether the user or another user in the area is a child and disabling, enabling, or modifying a subset of voice commands that the speech-based computing device will implement if the user is identified as a child.

7. The method of claim 1, wherein the one or more sensors include a passive infrared sensor, a thermopile, a camera, a microwave emitter, a radiofrequency wave emitter, a temperature sensor, an ambient noise level sensor, or a combination including at least one of the foregoing.

8. The method of claim 1, wherein the method further comprises retrieving prior user activity and the updating includes updating the one or more parameters with the prior user activity.

9. The method of claim 1, further comprising operating the speech-based computing device in accordance with the intended voice command.

10. A lighting system for augmenting voice commands from a user, comprising:

one or more light fixtures;

one or more sensors configured to collect data related to a location of the user, the data related to an area proximate to a speech-based computing device; and a controller configured to:

receive the data from the one or more sensors;
determine one or more cues user from the data;
determine a scenario in the area based on the one or more cues, the scenario including detecting a presence of an additional user;
disregarding the sound input based on the presence of the additional user;
receive one or more parameters related to a sound input received by the speech-based computing device, the one or more parameters including an estimated location of the user generated by the speech-based computing device using sound localization techniques;
update the one or more parameters with the cues;
analyzing the sound input with the updated parameters to interpret an intended voice command from the sound input; and
determining an identity of the user based on stored historical information, the stored historical information including previously determined cues.

11. The lighting system of claim 10, wherein the sensor includes a passive infrared sensor, a thermopile, a camera, a microwave emitter, a radiofrequency wave emitter, a temperature sensor, an ambient noise level sensor, or a combination including at least one of the foregoing.

* * * * *